Feb. 11, 1964   A. J. ROBERTSON   3,120,934
AIRCRAFT AUTOMATIC LANDING SYSTEM
Filed Jan. 9, 1963
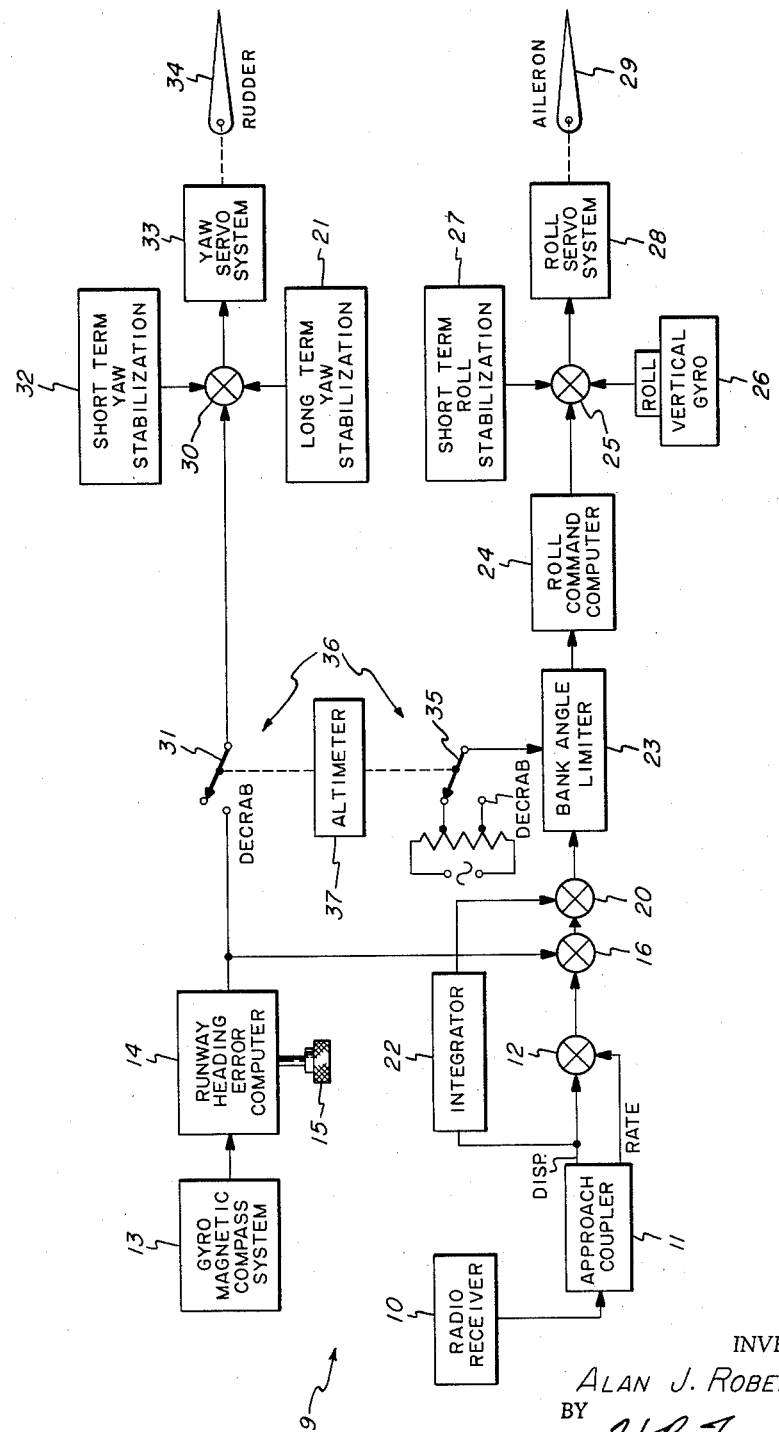
INVENTOR.
ALAN J. ROBERTSON
BY
ATTORNEY

United States Patent Office 3,120,934
Patented Feb. 11, 1964

3,120,934
AIRCRAFT AUTOMATIC LANDING SYSTEM
Alan J. Robertson, Greenlawn, N.Y., assignor to Sperry Rand Corporation, Great Neck, N.Y., a corporation of Delaware
Filed Jan. 9, 1963, Ser. No. 250,283
4 Claims. (Cl. 244—77)

This invention relates to an aircraft flight control system for guiding aircraft along a radio defined course and more particularly for automatically guiding a radio controlled aircraft to a safe landing on a runway, especially when a cross wind prevails.

In aircraft instrument landing systems (ILS), localizer and glide slope radio beams are generated from ground based transmitting stations located adjacent to the runway. The intersection of the radio beams defines the desired course which the aircraft is to travel in approaching the runway. The localizer beam guides the aircraft with respect to a fixed or determinable azimuthal course of flight while the glide slope beam serves the purpose of directing the aircraft on a fixed or determinable vertical course of flight as it approaches the runway. Usually, an aircraft is guided simultaneously by signals from both localizer and glide path transmitters so that the desired course of approach is defined in the horizontal plane by azimuthal heading and in the vertical plane by rate or angle of descent. The present invention is primarily concerned with lateral control of an aircraft while it is being guided by signals from a localizer or similar beam.

When a cross wind prevails, immediately prior to landing, the heading of the aircraft must be aligned with the runway by removing the crab angle that was required during the earlier portion of the approach to compensate for the cross wind. This is necessary in order that, at the time of touchdown, the forward velocity vector of the aircraft will be aligned with the runway and the cross-course velocity of the aircraft will be zero to prevent undue strain on the landing gear. It is desirable, at touchdown, to maintain the heading of the aircraft aligned with the runway and to maintain minimum cross-course velocity of the aircraft for the maximum amount of time consistent with a safe aircraft attitude.

The present invention is an improvement over that described in U.S. Patent No. 2,987,276, entitled "Aircraft Flight Control System," invented by Osder et al., issued June 6, 1961. The present invention utilizes a signal representative of the difference between the heading of the aircraft and that of the runway as a damping term to augment radio rate signals in the aileron channel and as a command term in the rudder channel to decrab the aircraft just prior to touchdown.

It is an object of the present invention to provide an automatic aircraft landing system for radio controlled aircraft.

It is a further object of the present invention to provide an automatic system for safely landing aircraft when a cross wind prevails.

The above objects are achieved by utilizing a signal representative of the runway heading error in an automatic flight control system during the approach until the touchdown. During the approach, a signal representative of the heading of the aircraft with respect to the heading of the runway is effective as an auxiliary damping control term in the roll channel in conjunction with a radio beam rate signal. As the aircraft nears the runway, the beam rate signal becomes erratic and unusable whereupon the heading error signal becomes the primary damping term. During the approach, the beam displacement signal is integrated and is introduced into the roll channel in opposition to the runway heading error signal. In the decrab position, the runway heading error signal is introduced into the rudder channel thereby rapidly yawing the aircraft in order that its heading is aligned with that of the runway. This results in the runway heading error signal going to zero causing the signal from the integrator in the roll channel to dip the windward wing thereby maintaining a minimum cross-course velocity at the time of touchdown.

It will become apparent that the foregoing objects have been achieved by the present invention upon a study of the following disclosure when considered in connection with the accompanying drawing which is a schematic block diagram of an aircraft flight control system utilizing the present invention.

In order to achieve a safe landing, particularly in the presence of a cross wind, the forward velocity vector of the aircraft should be substantially aligned with the runway heading at the time of touchdown and the aircraft should have a substantially zero cross-course velocity. Immediately prior to touchdown, the aircraft by means of the present invention is automatically yawed in a substantially flat skid turn and the heading of the aircraft is thereby aligned with that of the runway. The present invention further maintains the aircraft in a zero cross-course velocity condition by maintaining the windward wing of the airplane slightly down during the decrabing and landing maneuver in a manner to be explained.

Referring now to the drawing, the automatic landing system 9 is shown in an approach mode and includes a radio navigation receiver 10 mounted on the aircraft. The radio navigation receiver 10 provides D.C. signals based upon signals received from a ground based radio transmitter such as the localizer transmitter of an instrument landing system (ILS). The D.C. signal from the receiver 10 has a magnitude and plurality representative of the lateral displacement and direction respectively of the aircraft with respect to the center of the localizer beam which defines the desired radio course. An approach coupler 11 is connected to receive the D.C. signals from the navigation receiver 10 and converts them to A.C. signals proportional to the lateral displacement of the aircraft from the localizer beam and to the lateral rate of displacement of the aircraft from the localizer beam, in a manner more fully described in U.S. Patent No. 2,801,259. The beam displacement signal provides a measure of the displacement and the direction of the craft with respect to the radio defined course while the beam rate signal is intended to provide flight path damping with respect to the radio defined course. The beam displacement and beam rate signals from the approach coupler 11 are connected to an algebraic summation device 12 where they are algebraically summed.

A conventional gyromagnetic compass system 13 provides a signal representative of the aircraft heading. The compass system 13 is connected to a runway heading error computer 14. The heading of the runway upon which the aircraft is to land is introduced into the computer manually by means of a runway heading selector knob 15 in order that the output from the computer 14 is representative of the difference between the aircraft heading and the heading of the runway, i.e., the runway heading error signal. The computer 14 is connected to an input terminal of an algebraic summation device 16 which has its other input terminal connected to the output terminal of the algebraic summation device 12. The output terminal of the algebraic summation device 16 is connected to an input terminal of an alegbraic summation device 20. The beam displacement signal from the approach coupler 11 is also connected to an electromechanical integrator 22. The integrated output of the integrator 22 is connected to an input terminal of the algebraic summation device 20 in opposition to the signal from the runway heading error computer 14. The signals into the algebraic summation device 20 are algebraically summed therein and the output is connected to a bank angle limiter 23, which in turn is connected to a roll command computer 24. The limiter 23, the roll command computer 24 and many other components indicated by the blocks in the drawing may be similar to the equivalent components described more fully in U.S. Patent 3,007,656, entitled "Aircraft Automatic Pilots," of H. Miller et al., issued November 7, 1961. The function of the limiter 23 is to limit the amplitude of the input signal to the roll command computer 24 and thus to limit the magnitude of the commanded bank angle to prevent the craft from rolling to a dangerous bank angle. By varying the potential applied to the limiter 23, as schematically shown, the bank angle limits determined by the limiter 23 may be varied in a manner to be described. The roll command computer 24 serves primarily to smooth the roll command signals applied thereto. The output of the roll command computer 24 is connected to an input terminal of an algebraic summation device 25 where the roll command signal is compared with the signal proportional to the roll attitude of the aircraft from a vertical gyro 26. Signals indicative of the short-term attitude of the craft about the roll axis are provided by short-term stabilization means 27 which is also connected to an input terminal of the algebraic summation device 25. The short-term roll stabilization means 27 may include as a primary sensors a pair of roll accelerometers to provide a measure of angular acceleration about the roll axis in a manner fully described in said U.S. Patent 3,007,656.

The output of the summation device 25 is connected to the input of the roll servo system 28 which in turn is connected to position the aileron 29. It will be understood that the aircraft flight control system 9 shown in the drawing is intended to be schematic and does not include many of the refinements normally utilized in such apparatus.

The runway heading error computer 14 is also connected to an input terminal of an algebraic summation device 30 in the rudder channel through the contact arm 31 when the arm 31 is in its lowermost or decrab position. The output of short-term yaw stabilization means 32 is also connected to an input terminal of the summation device 30. The short-term stabilization means 30 may be of the type shown in said U.S. Patent 3,007,656, and include a pair of yaw accelerometers which provide a measure of angular acceleration about the yaw axis. Long-term stabilization signals about the yaw axis are provided by long-term stabilization means 21 which is connected to an input terminal of the summation device 30. The output of the summation device 30 is connected to the input of a yaw servo system 33 which in turn is connected to position the rudder 34. Contact arms 31 and 35 of decrab switch 36 are ganged for simultaneous movement when actuated by an altimeter 37 in a manner to be explained.

In describing the operation of the present invention, it is assumed that the aircraft is making a radio controlled approach with a cross wind of constant velocity prevailing. As the aircraft initially turns to approach the localizer beam, the radio navigation receiver 10 provides a signal indicative of the lateral departure of the aircraft from the radio defined course, i.e., the center of the localizer beam. This signal is converted in the approach coupler 11 to signals representative of the beam displacement and the beam rate. The beam displacement and the beam rate signals are compared with the signals from the vertical gyro 26 in the algebraic summation device 25, and the output therefrom is a roll command signal into the roll servo system 28 which positions the aileron 29 in a direction to bank the aircraft to asymptotically approach the center of the localizer beam.

As the aircraft continues to approach the localizer beam, a position is reached when the aircraft is approximately stabilized on the beam in which the beam displacement and rate signals are below predetermined minimum values which define on-course flight at which time the automatic landing system 9 is as shown with the contact arms 31 and 35 in their uppermost or approach positions.

Sometime prior to the approach, the human pilot has manually adjusted the runway heading selector knob 15 to insert the heading of the selected runway into the computer 14. The runway heading error signal from the computer 14 is introduced through the summation device 16 as a damping term to augment the beam rate signal which becomes erratic as the runway is approached.

The integrator 22 integrates the beam displacement signal to eliminate beam standoff which, due to the runway heading error signal, can be caused by crosswinds. Thus, as the aircraft is flying down the glide slope, the beam displacement and rate signals are equal to zero if the aircraft is on the beam and the voltage produced from the integrator 22 is equal and opposite to the runway heading error signal from the computer 14. The flight path of the aircraft is thereby aligned with the center of the localizer beam while its heading diverges therefrom by the amount of the crab angle. The roll channel of the landing system is thus synchronized to a crabbed heading reference and the aircraft heading reference becomes crabbed heading rather than runway heading.

As the aircraft nears the runway the output of the radio receiver 10 becomes more sensitive to aircraft deviations from the beam reference because of the convergent nature of the beam, and as a consequence, the control period of the aircraft-flight control system combination tends to decrease. At the shorter control periods, the beam rate signal from the approach coupler 11 becomes erratic and the runway heading error signal becomes the primary damping term during the final phases of the approach. The beam rate signal may be filtered, disconnected, or the gain thereof decreased in a manner disclosed in said U.S. Patent 2,987,276.

As explained above, radio guidance control systems use beam displacement and beam rate signals to command roll attitude and hence heading rate and cross beam acceleration. Appropriate gain levels produce a damped second order equation of control under these circumstances. However, at the low gain levels necessary for stable control to within two or three thousand feet of the radio transmitter, the aircraft response to a disturbance is slow and recovery periods are long. For example, with a displacement gain of 4 degrees of bank per degree of beam, the time required to reduce a beam error to 10% is in the order of one minute or two miles of ground track. Also it is undesirable to cross the runway threshold area while holding a ten degree bank angle, for example. Therefore commanding heading rate through the rudder channel, i.e., skidding the aircraft, provides a more rapid and practical means of control. Flight tests indicate that the gain for this skid mode of control is approximately one degree of heading per second per degree of beam which is equivalent to a displacement to roll gain of 6 degrees per degree for a DC-3 type of aircraft.

At a particular point above the runway immediately prior to touchdown, for example, 10 feet above the runway, the altimeter 37 actuates the contact arms 31 and 35 to their lowermost positions to initiate a decrab maneuver. This connects the runway heading error signal from the computer 14 through the contact arm 31 and summation device 30 to the yaw servo system 33. The yaw servo system 33 in response to the runway heading error signal drives the rudder 34 in a direction to rapidly yaw the aircraft in a flat skid turn to remove the crab angle thereby aligning the longitudinal axis of the aircraft and its forward velocity vector with the runway.

As the aircraft rotates to the runway heading, the signal from the integrator 22, which is no longer opposed by the heading error signal from the computer 14 since the latter signal has gone to zero, commands the aircraft to bank in the direction of the crabbed heading reference. This results in the aircraft being rotated to substantially the runway heading and banked into the wind. It thus lands in a skidding condition, holding rudder of one polarity and opposite roll attitude.

The ratio of bank and sideslip defines the required heading to roll gain which is desirable for beam damping. Representative figures for a DC-3 aircraft with a 20 knot cross wind have been found to be 4 degrees of bank, 12 degrees of sideslip and 20 degrees of rudder.

As an additional safety factor with the aircraft only a few feet above the runway, the maximum bank angle is limited to a relatively small angle, for example, less than 5 degrees. This may be accomplished at the decrab maneuver by means of the altimeter 37 which positions the contact arm 35 to its lowermost position to vary the potential applied to the limiter 23 in order to limit the amplitude of the signal into the roll command computer 24 to prevent the craft from rolling to a dangerous bank angle.

The decrab control action explained above is intended to imitate the method used by human pilots in making cross wind landings, that is to bank the aircraft into the wind and hold enough opposite rudder to hold zero heading error thereby aligning the longitudinal axis of the aircraft with the runway while maintaining a minimum aircraft cross-course velocity for a maximum amount of time consistent with a safe landing.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An aircraft automatic landing system for guiding an aircraft to a landing along a radio defined course comprising,
    (a) radio receiving means for providing a first control signal in response to the lateral displacement of the aircraft from said course,
    (b) means for providing a second control signal representative of the lateral rate of displacement of the aircraft from said course,
    (c) means for providing a third control signal representative of the heading of the aircraft with respect to the heading of a predetermined runway,
    (d) integrating means responsive to said first control signal for providing a fourth control signal representative of the integral thereof,
    (e) roll servo means responsive to said first, second, third and fourth control signals for controlling the aircraft in roll in accordance therewith,
    (f) yaw servo means for controlling the aircraft in yaw, and
    (g) switch mean for selectively connecting said yaw servo means in one condition to be responsive to said third control signal at a predetermined decrab attitude.

2. An aircraft automatic landing system for guiding an aircraft to a landing along a radio defined course comprising,
    (a) radio receiving means for providing a first control signal in response to the lateral displacement of the aircraft from said course,
    (b) means responsive to said first control signal for providing a second control signal representative of the lateral rate of displacement of the aircraft from said course,
    (c) means for providing a third control signal representative of the heading of the aircraft with respect to the heading of a predetermined runway,
    (d) integrating means responsive to said first control signal for providing a fourth control signal representative of the integral thereof and opposite in phase to said third control signal,
    (e) roll servo means responsive to said first, second, third and fourth control signals for controlling the aircraft in roll in accordance therewith,
    (f) yaw servo means for controlling the aircraft in yaw, and
    (g) switch means for selectively connecting said yaw servo means in one condition to be responsive to said third control signal at a predetermined decrab attitude for rapidly yawing said aircraft to substantially the heading of said runway.

3. An aircraft automatic landing system for guiding an aircraft to a landing on a runway along a radio defined course comprising,
    (a) means including radio receiving means for providing first and second control signals varying respectively in accordance with the lateral displacement and the lateral rate of displacement of the aircraft from said course,
    (b) means for providing a signal representative of the heading of the aircraft,
    (c) means for providing a signal representative of the heading of said runway,
    (d) means responsive to said aircraft heading and runway heading signals for providing a third control signal representative of the runway heading error,
    (e) means responsive to said first control signal for providing a fourth control signal representative of the integral of said first control signal,
    (f) roll servo means responsive to said first, second, third and fourth control signals for controlling the aircraft in roll in accordance with the combination thereof,
    (g) yaw servo means for controlling the aircraft in yaw,
    (h) means including switch means for selectively connecting said yaw servo means in one condition to be responsive to said third control signal, and
    (i) means for energizing said switch means at a predetermined point above said runway for rendering said yaw servo means responsive to said third control signal whereby when a cross wind prevails which requires the airplane to maintain a crab angle, immediately prior to landing, the heading of the aircraft is substantially aligned with the heading of the runway and the windward wing of the aircraft is maintained slightly down to maintain the aircraft aligned with the runway for an optimum time interval with a minimum cross-course velocity.

4. A system of the character described in claim 3 including limiting means responsive to said first, second, third and fourth control signals for limiting their effectiveness on said roll servo means whereby the craft is prevented from exceeding a predetermined bank angle.

No references cited.